United States Patent [19]

Ando

[11] 4,366,356
[45] Dec. 28, 1982

[54] COMPACT INDUCED CURRENT HEAT-GENERATING PIPE

[75] Inventor: Masao Ando, Yokohamashi, Japan

[73] Assignee: Chisso Corporation, Tokyo, Japan

[21] Appl. No.: 244,689

[22] Filed: Mar. 17, 1981

[30] Foreign Application Priority Data

Mar. 18, 1980 [JP] Japan ................................ 55-34231

[51] Int. Cl.³ .......................... H05B 6/44; F24J 3/04
[52] U.S. Cl. .............................. 219/10.51; 219/300;
219/10.49 R; 219/10.79; 137/341
[58] Field of Search ............... 219/10.51, 10.49, 10.57, 219/10.43, 10.79, 300, 301; 137/341; 138/33

[56] References Cited

U.S. PATENT DOCUMENTS

| | | | |
|---|---|---|---|
| 3,515,837 | 6/1970 | Ando | 219/10.51 X |
| 3,617,699 | 11/1971 | Othmer | 219/10.51 X |
| 3,665,154 | 5/1972 | Ando | 219/301 |
| 4,123,837 | 11/1978 | Horner | 219/301 X |

Primary Examiner—Elliot A. Goldberg
Assistant Examiner—Philip H. Leung
Attorney, Agent, or Firm—Fred Philpitt

[57] ABSTRACT

A compact induced heat-generating pipe useful for shorter bodies to be heated, such as small scale pipelines, the heat-generating pipe consisting of at least one set of two or three ferromagnetic pipes and an insulated wire passing therethrough and connected to an A.C. source, the respective pipes being electrically connected to each other at both the respective ends; thickness t of the pipes having a relationship of $0.5\,s \leq t < s$, wherein s is the skin depth of A.C. flowing through the pipes; the pipes of each set being brought into close proximity to each other; and the length of the pipes being 1 Km or shorter.

12 Claims, 7 Drawing Figures

COMPACT INDUCED CURRENT HEAT-GENERATING PIPE

BACKGROUND OF THE INVENTION

1. Field of the Invention

This invention relates to a compact induced current heat-generating pipe and a construction wherein the same is applied.

2. Description of the Prior Art

Heretofore, a heat-generating pipe referred to as induced skin effect current heat-generating pipe has been known and applied to heating of pipelines, etc. This heat-generating pipe is described in e.g. "Electric Engineering Handbook" edited by The Institute of Electrical Engineers of Japan, page 1578, 1978 edition, and the specification of Japanese patent publication No. Sho 46-588 (1971) (to which U.S. Pat. No. 3,515,837 corresponds). This heat-generating pipe is composed of (1) insulated wires either in two rows in the case where an electric source of single-phase alternating current is employed, or in the three rows in case where an electric source of three-phase alternating current is employed, the respective ends of these wires on one side being electrically connected to each other and those on the other side being connected to the respective phases of the above-mentioned alternating current electric source, and (2) two or three electrically conductive ferromagnetic pipes through which the respective wires in such rows are passed, and which are electrically connected to each other at both the ends thereof; the thickness of the ferromagnetic pipe being made at least twice the skin depth of the alternating current to be passed through the pipe; and when the alternating current flows through the ferromagnetic pipe, it is concentrated on the inner skin portion of the pipe and heat is mainly generated there.

However, the electrically conductive ferromagnetic pipe of the above-mentioned induced skin effect current heat-generating pipe is required to have a thickness of at least twice the skin depth of the alternating current as mentioned above so that the alternating current flowing therethrough substantially does not appear on the outer surface of the pipe; hence such a heat-generating pipe is restricted in the uses.

For example, if a commercial frequency of 50 Hz or 60 Hz is employed for the alternating current source and a commercially available steel pipe is employed as the above-mentioned electrically conductive ferromagnetic pipe, the above-mentioned skin depth is about 1 mm; hence a steel pipe having a thickness of about 3 mm and an inner diameter of about 15 to 50 mm should be employed. Such a heat-generating steel pipe is suitable to heating and temperature-maintenance of pipelines having a length of several kilometers or longer and an inner diameter of 10 cm or more, but when such a pipe is applied to small scale pipelines having e.g. a length of 1 Km or less, particularly several tens to several hundreds meters and a diameter of 5 cm or less, such a pipe is too large, resulting in the following inconveniences:

(1) In the case of the above-mentioned dimensions of the heat-generating steel pipe, i.e. a thickness of 3 mm, and an inner diameter of 15 to 50 mm, such pipe has a large geometrical moment of inertia and a low flexibility; hence its contact with transporting main pipes which is necessary for heat transfer from the pipe to the main pipes is difficult. Thus, welding or the like means has heretofore been applied. However, welding not only requires a special technique, but cannot be applied at the site where flammable gases are liable to be generated. Further, it is also uneconomical to employ welders for small scale pipelines.

(2) When the heat-generating steel pipe has a large diameter as compared with that of transporting main pipes, a covering heat-insulating cylinder having a larger diameter is required as compared with the case where other kinds of heat-generating bodies having a smaller diameter are employed, which is uneconomical.

Such inconveniences can be overcome by reducing the outer diameter and thickness of the heat-generating pipe. Namely, the flexibility of the heat-generating steel pipe increases in inverse proportion to its geometrical moment of inertia, which, in turn, is proportional to the difference between the fourth power of the outer diameter of the pipe and the fourth power of the inner diameter thereof, and as a result, approximately proportional to the product of the third power of the average diameter by the thickness; hence the moment can be reduced by reducing the inner and outer diameters and also reducing the thickness.

The inner diameter of the heat-generating steel pipe is restricted in the minimum value by the diameter of the insulating wire passed through the inside of the pipes. On the other hand, as to the thickness of the heat-generating steel pipe, if the thickness t is decreased so as to give a relationship $$t < 2s$$

wherein s represents the so-called skin depth showing a range within which the alternating current flows through the pipe, then there may occur a danger that an alternating voltage appears on the outer surface of the heat-generating steel pipe.

Contrary to the case of the above-mentioned induced skin-effect current heat-generating pipe, the first object of the present invention is to make the thickness of the electrically conductive ferromagnetic pipe less than twice the skin depth of the alternating current flowing through the ferromagnetic pipe, and also suppress the voltage appearing on the outer surface of the pipe to substantially zero or to an extent not harming safety.

The second object of the present invention is to provide a compact and small scale heating apparatus which is convenient for heating.

The third object of the present invention is to provide a construction wherein heat can be well transferred without welding, in the case where it is impossible or undesirable due to the material, environment, small scale, etc. of the body to be heated, to weld the heat-generating pipe onto the body to be heated.

SUMMARY OF THE INVENTION

The present invention resides in the following induced current heat-generating pipe:

In an induced current heat-generating pipe which is composed of (1) insulated wires either in two rows in case where an electric source of single-phase alternating current is employed, or in three rows in case where an electric source of three-phase alternating current is employed, the respective ends of these wires on one side being electrically connected to each other and those on the other side being to be connected to an alternating current electric source, whereby the insulated wires form a primary circuit, and (2) at least one set of two or three electrically conductive ferromagnetic pipes of substantially the same length, the respective wires in the rows being passed through the respective pipes, the respective two ends of the pipes being electrically connected to each other, and in case where a plurality of sets are provided, the respective sets of the pipes forming an independent secondary circuit relative to the primary circuit common to these sets of the pipes, the improvement which is characterized in that the thickness of said ferromagnetic pipes has a relationship of $0.5s \leq t < 2s$ relative to the skin depth s of the alternating current flowing through said ferromagnetic pipes; said two or three ferromagnetic pipes are brought into close contact with each other; and the respective ferromagnetic pipes of said at least one set have a length of 1 Km or less.

The electrical connection of the insulated wires in two rows or three rows, at the respective ends thereof on one side, includes a case where independent wires are connected together at the ends thereof and a case where the wires consist of a single wire continued from the beginning.

DESCRIPTION OF THE PREFERRED EMBODIMENTS

Figure 1:
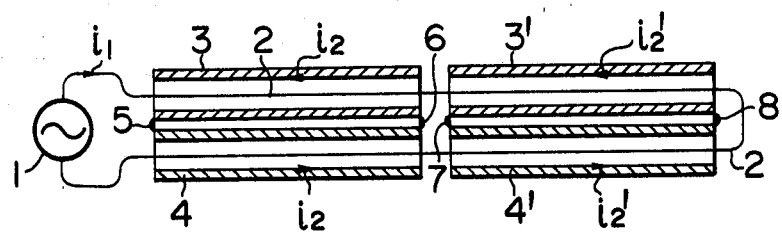
FIG. 1 shows a schematic cross-sectional view of the heat-generating pipe of the present invention for illustrating the principle thereof, wherein the electric source is in a single phase.

Examples of the electrically conductive ferromagnetic pipe employed in the present invention are usual steel pipes and chrome-containing iron alloy pipes.

For simplicity, description will be made referring to steel pipes as a representative of the electrically conductive ferromagnetic pipe.

As for the length of the respective steel pipes of one set in the present invention, 1 Km or less is sufficient from the viewpoint of safety. For making the heat-generating pipe compact and convenient to transportation and setup, it is recommended that the length of the steel pipes of one set is made several tens meters at the most, more particularly 50 m or less and two or three steel pipes are brought into close contact and connected by welding to each other at both the ends thereof so as to give an impedance as close to zero as possible, in a factory or the like in advance. The lower limit of the length of the respective steel pipes of one set may be about 0.5 m although it depends on the shape, length and heat quantity required, of the bodies to be heated. In case where the heat quantity required is small, a space where any heat-generating pipe is absent may be provided between the adjacent sets, whereby the providing density of the heat-generating pipes is adjusted. Too short steel pipes are undesirable since the welding times of the pipes at the ends thereof increase and the operation of providing the heat-generating pipes onto the bodies to be heated becomes cumbersome.

In the present invention, the construction where steel pipes of one set in two rows or three rows are brought into close contact and electrically connected to each other at least at both the ends thereof, includes not only the above-mentioned structure where mutually independent pipes are brought into close contact and connected by welding onto each other at both the ends thereof so as to give an impedance as close to zero as possible, but a structure consisting of one pipe having two or three through-holes therein. The state of close contact of steel pipes in three rows in the case of three-phase current includes not only a case where each one pipe is brought into close contact with two other pipes, but a case where two pipes are brought into close contact with one pipe at both the sides of this one pipe, and the two pipes are not brought into contact with each other. The former case has a merit in that the tendency that substantially no current appears onto the outer surface of the pipe is greater in the former case than in the latter case, but the former case is usually inferior to the latter case in respect of heat transfer.

In the present invention, since the steel pipes have a less thickness than those of conventional induced skin effect current heat-generating pipes, they are flexible as much and easily brought into close contact with the bodies to be heated, in conformity with their shapes; however, in order to make the close contact easier, it is preferable to employ mild steel pipes.

For fixing the heat-generating pipe of the present invention onto bodies to be heated, so as to give a good heat transfer, it is preferable to place therebetween a heat-resisting elastic material such as silicone rubber, heat-resisting rubber, heat-resisting polyethylene, etc. and fasten them together by means of a band around them.

The present invention will be further described referring to the accompanying drawings.

In FIG. 1, numeral 1 shows an electric source of single-phase alternating current and numeral 2 shows an insulated wire passing in series through steel pipes 3 and 4 of one set and steel pipes 3' and 4' of another set, and connected to the electric source of alternating current 1.

The steel pipes 3 and 4 of one set and those of 3' and 4' of another set are constructed so as to be brought into close contact with each other, respectively (however, the respective steel pipes in two rows in FIG. 1 being shown as those having a gap therebetween, for convenience of understanding the principle of the present invention), and also so as to be electrically connected at at least the respective two ends thereof, i.e. 5, 6 and 7, 8 so as to give an impedance as close to zero as possible, whereby a secondary circuit is formed in each set independently from each other set and such independent secondary currents $i_2$ and $i_2'$ flow through the respective pipes. It is convenient to carry out the connection by welding in a factory in advance. This welding may be applied onto the close contact part over the total length thereof. Alternatively, one steel pipe having two through-holes therein may be employed. In FIG. 1, a case of two sets of steel pipes 3, 4 and 3', 4' is shown, but if the body to be heated is, for example, a long pipeline, more sets corresponding to the length of the pipeline are required. Further, in FIG. 1, a case of an electric source of single-phase alternating current is shown, but, in a case of an electric source of three-phase electric current, it goes without saying that three steel pipes are required for constituting each set.

Figure 5:
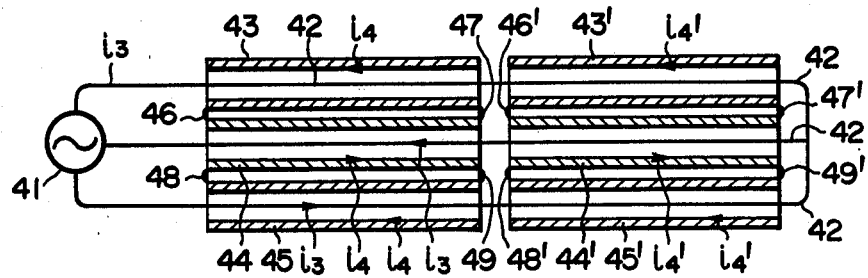
FIG. 5 shows a schematic cross-sectional view of the heat generating pipe of the present invention for illustrating the principle thereof, wherein the electric source is in a three phase.

This is shown in FIG. 5 wherein numerals 43, 44 and 45 show a set of steel pipes and those of 43', 44' and 45' show another set of steel pipes, through the respective insides of which an insulated wire is passed and connected to an electric source 41 of three-phase alternating current. Numerals 46, 47 48 and 49 show electrical connections at the respective two ends of the steel pipes 43, 44 and 45. Similarly, numerals 46', 47' 48' and 49' show electrical connections at the respective two ends of steel pipes 43', 44' and 45'. $i_3$ shows a primary current, and $i_4$ and $i_4'$, shows a secondary current, respectively.

When the thickness of steel pipe is made less than twice the skin depth of the alternating current flowing through the pipe, as in the present invention, a leakage voltage will appear onto the outer surface of the electrically conductive ferromagnetic pipe unless a particular device is employed, unlike the case of the skin effect current heat-generating pipe. In the present invention, in order to reduce this leakage voltage down to substantially zero or an extent which does not harm safety, induced current heat-generating pipes are employed, and also steel pipes in two or three rows are brought into close contact and the length of the steel pipes of each set is made 1 Km or less (preferably several tens meters or less).

Figure 2A:
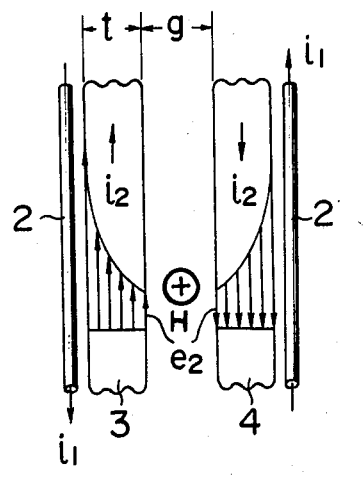
FIG. 2a shows a view illustrating an interrelationship among the primary and secondary currents, the magnetic field outside the pipe and the electric field distribution relative to the thickness of the pipe, in an induced current heat-generating pipe wherein the thickness of two steel pipes constituting the heat-generating pipe is less than twice the skin depth of the alternating current flowing through the pipes, and there is a gap between the steel pipes.
Figure 2B:
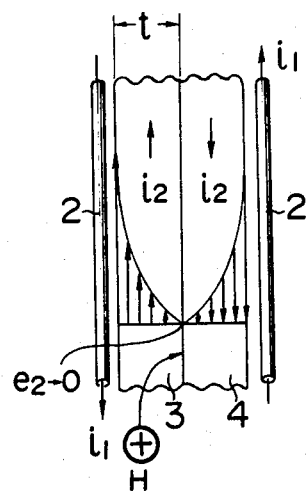
FIG. 2b shows the same view as that of FIG. 2a except that there is no gap between the steel pipes.

The reason that, in the case of the heat-generating pipe of the present invention, the voltage which appears on the outer surface of the steel pipes does not amount to a value which raises a problem in practical use is as follows:

FIG. 2a and FIG. 2b schematically illustrate respectively an interrelationship between the cross-sections of the steel pipes 3, 4 of FIG. 1 on the opposed sides of the pipes and the insulated wires 2. In these figures, the thickness t of the pipes 3, 4 is made nearly equal to s, and the gap between steel pipes 3, 4 is made g in FIG. 2a and zero in FIG. 2b (the case of the present invention).

Further, when the primary current flowing through the insulated wire 2 is $i_1$ and the secondary current flowing through the steel pipes 3, 4 is $i_2$, then $i_2$ is equal to an integral value of the electric densities between $(0-t)$ which densities are respectively a product of (the strength e of the electric field generated within the thickness of the steel pipes 3, 4 which strength is determined by the primary current $i_1$ and frequency, the material, dimension and interrelationship such as g of the steel pipes 3, 4) × (the electric conductivity of the steel pipes).

Under such a condition, the strength H of the magnetic field outside the steel pipes 3, 4 is proportional to $(i_1 - i_2)$, i.e.

$$H \propto (i_1 - i_2) \qquad (1)$$

In the case of $t \geq 2s$ as in the case of conventional skin effect current heat-generating pipe, $$i_1 \approx i_2 \qquad (2)$$

Accordingly, even if there is a gap g between the steel pipes 3, 4 as in the case of FIG. 2a, the magnetic field H within this gap is nearly zero and the electric fields $e_2$ on the outer surface of the steel pipes 3, 4 are also nearly zero; hence such steel pipes have been safely employed as a heat-generating pipe.

In the present invention, however, the thickness t of the steel pipes 3, 4 is made $t < 2s$, for example, $t = s$; hence the magnetic field H cannot be made nearly zero; and the electric fields $e_2$ on the outer surface of the steel pipes are proportional to the total quantity gH of the alternating magnetic flux, that is, $$e_2 \propto gH \qquad (3)$$

Thus, for reducing $e_2$ down to as small a value as possible, a new first condition is required that the value of g is made zero, i.e. the steel pipes 3, 4 are brought into close contact and an impedance as close to zero as possible is given at both the ends thereof.

The electric field distribution e within the thickness t of the steel pipes, 3, 4 under the above first condition of $g \to 0$ and electric connection of the steel pipes at both the ends thereof is shown in FIG. 2b. In this FIG. 2b, the electric fields $e_2$ on the outer surface of the steel pipes are nearly zero.

Under the first condition, $e_2$ can be restricted to a small value, but if $e_2$ is nevertheless insufficiently reduced, a second condition is applied that the lengths l of the steel pipes 3, 4 and 3', 4' of each set are restricted and independent primary circuits are formed in the respective sets, whereby it is prevented that the electric fields $e_2$ i.e. the leakage voltages of the steel pipes 3, 4 and 3', 4' are integrated in the direction of the length l and increase.

Figure 3:
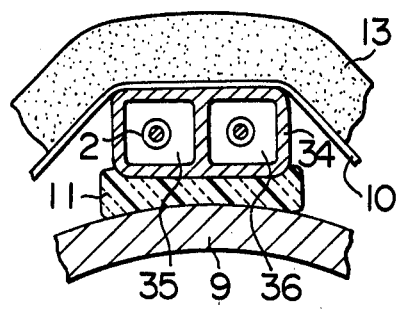
FIG. 3 shows a vertically cross-sectional view of the main part of an embodiment of the present invention.

The above description is directed to a case of employing two steel pipes 3, 4, but as a case satisfying the above-mentioned conditions, for example, it is possible, as shown in FIG. 3, to employ one steel pipe 34 in place of the two steel pipes 3, 4, which pipe 34 has therein two through-holes 35 and 36 and also has a thickness corresponding to those of the pipes 3, 4. Of course, in the case of three-phase, the pipe 34 is to have three through-holes.

In addition, the following description is made for precaution's sake:

In FIGS. 1 and 2, the steel pipes 3, 4 form a secondary induction circuit, respectively; hence if their thickness t is made close to zero ($t \to 0$), then $e \to 0$ i.e. $i_2 \to 0$. Thus the steel pipes cannot function as a heat-generating pipe. Accordingly, the lower limit of t is determined of itself from the standpoint of heat-generating pipe; and a value to an extent of 0.5s is preferable. If the thickness is too small, the steel pipes cannot function not only as a heat-generating pipe, but as a mechanically protecting pipe for the insulated wire.

Figure 4:
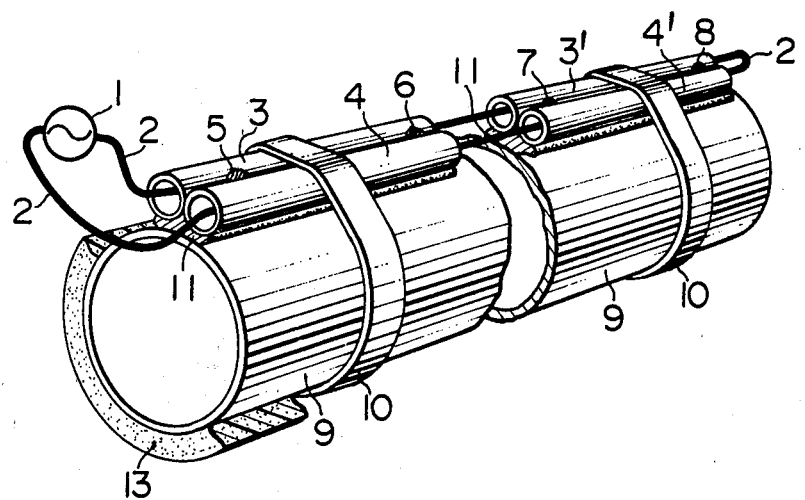
FIG. 4 shows a perspective view of the main part of an embodiment of the present invention in the case of sets of two ferromagnetic pipes for a single phase system, when a pipeline is heated.

FIG. 4 shows a case where the heat-generating pipe of the present invention of single phase is applied to heating and temperature-maintenance of a pipeline. In FIG. 4, numerals 1 to 8 have the same meanings as those in FIG. 1, and as for other numerals, numeral 9 shows a pipeline for which heating and temperature-maintenace are required; numeral 10, a band by which the steel pipes 3, 4 and 3', 4' constituting the induced current heat-generating pipe are fastened onto the pipeline 9 by the medium of a heat-resisting elastic material 11 placed therebetween; and numeral 13, a heat insulating material.

Figure 6:
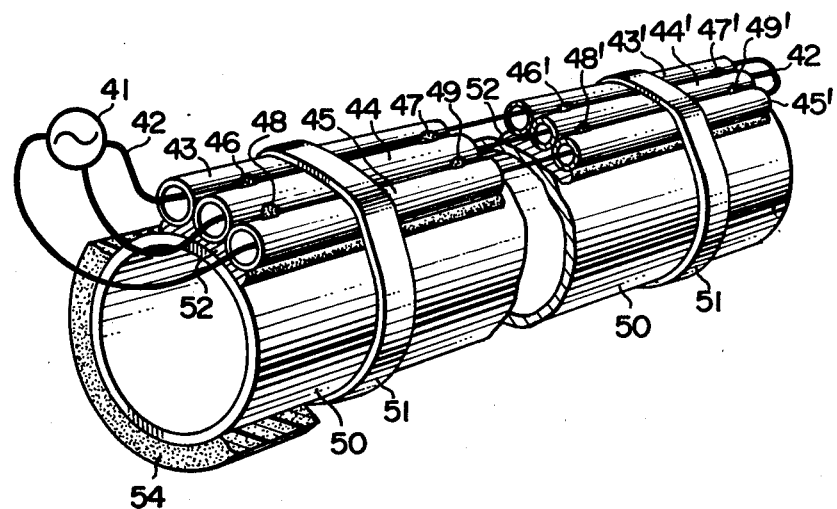
FIG. 6 shows a perspective view of the main part of another embodiment of the present invention in the case of sets of three ferromagnetic pipes for a three phase system when a pipeline is heated.

FIG. 6 shows a case where the heat-generating pipe of the present invention of three-phase is applied to heating and temperature-maintenance of a pipeline. In FIG. 6, numerals 41 to 49 have the same meanings as those in FIG. 5, and as for other numerals, numeral 50 shows a pipeline for which heating and temperature-maintenance are required; numeral 11, a band by which the steel pipes 43, 44, 45 and 43', 44', 45' constituting the induced current heat-generating pipe are fastened onto the pipeline 10 by the medium of a heat-resisting elastic material 12 placed therebetween; and numeral 14, a heat-insulating material.

FIG. 3 shows a cross-sectional view of a pipeline to be subjected to heating and temperature-maintenance as in the case of FIG. 4, but, in this case, the steel pipes 3, 4 are replaced by one steel pipe 34 having therein two through-holes, as mentioned above.

As shown in FIGS. 3 and 4, the outer dimension of the steel pipes 3, 4 or the steel pipes 34 should be arranged so as to be made larger in the direction parallel to the surface of the transporting main pipe 9 but smaller in the direction perpendicular thereto; whereby the inner diameter of the heat insulating cylinder is not made larger than that required, the heat transfer area is not made smaller and the geometrical moment of inertia of the pipes in the direction of the main pipe is not made larger (i.e. the flexibility thereof in the direction of the main pipe is made better).

What is claimed is:

1. In an induced current heat-generating pipe consisting of (1) insulated wires in rows, the respective ends of these wires on one side being electrically connected to each other and those on the other side being connected to an alternating current electric source, whereby said insulated wires form a primary circuit, and (2) at least one set of rows of electrically conductive ferromagnetic pipes of substantially the same length, the respective wires in said rows being passed through the respective pipes and the respective two ends of the pipes being electrically connected to each other, and in case where a plurality of sets are provided, the respective sets of the pipes forming an independent secondary circuit relative to the primary circuit common to these sets of the pipes, the improvement which is characterized in that the thickness of said ferromagnetic pipes has a relationship of $0.5s \leq t < 2s$ relative to the skin depth s of the alternating current flowing through said ferromagnetic pipes; said ferromagnetic pipes in each set are brought into close proximity to each other; and the respective ferromagnetic pipes of said at least one set have a length of 1 Km or less.

2. An induced current heat-generating pipe according to claim 1 wherein said set of rows of ferromagnetic pipes electrically connected at both the respective ends thereof consists of mutually independent two or three ferromagnetic pipes brought into close proximity to each other and electrically connected to each other by welding at both the respective ends thereof.

3. An induced current heat-generating pipe according to claim 1 wherein said set of rows of ferromagnetic pipes electrically connected at both the respective ends thereof consists of one pipe having thereon two or three through-holes.

4. An induced current heat-generating pipe according to claim 1 or claim 2 or claim 3 wherein the respective ferromagnetic pipes of said set have a length of 0.5 to 50 m.

5. An induced current heat-generating pipe according to claim 1 or claim 2 or claim 3 wherein the respective ferromagnetic pipes are of mild steel.

6. An induced current heat-generating pipe according to claim 4 wherein the respective ferromagnetic pipes are of mild steel.

7. A construction which mainly comprises:
an induced current heat-generating pipe which is composed of (1) insulated wires either in two rows in case where an electric source of single-phase alternating current is employed, or in three rows in case where an electric source of three-phase alternating current is employed, the respective ends of these wires on one side being electrically connected to each other and those on the other side being connected to the respective phases of the alternating current electric source, and (2) at least one set of two or three electrically conductive ferromagnetic pipes of substantially the same length, the respective wires in said rows being passed through the respective pipes and the respective two ends of the pipes being connected to each other, and in case where a plurality of sets are provided, the respective sets of the pipes forming independent secondary circuits of each other, relative to a common primary circuit to these sets of the pipes, formed by said insulated wires,
said induced current heat-generating pipe being characterized in that the thickness t of said ferromagnetic pipes has a relationship of $0.5s \leq t < 2s$ relative to the skin depth s of the alternating current flowing through said ferromagnetic pipes; said ferromagnetic pipes in each set are brought into close proximity to each other; and the respective ferromagnetic pipes of said at least one set have a length of 1 Km or less;
a body to be heated by said induced current heat-generating pipe; and
a heat-resisting elastic material placed between said induced current heat-generating pipe and said body to be heated;
said induced current heat-generating pipe, said body to be heated and said heat-resisting elastic material being fastened together by means of a band around them.

8. A construction according to claim 7 wherein said set of rows of ferromagnetic pipes electrically connected at both the respective ends thereof consists of mutually independent two or three ferromagnetic pipes brought into close proximity to each other and electrically connected to each other by welding at both the respective ends thereof.

9. A construction according to claim 7 wherein said set of rows of ferromagnetic pipes electrically connected at both the respective ends thereof consists of one pipe having therein two or three through-holes.

10. A construction according to claim 7 or claim 8 or claim 9 wherein the respective ferromagnetic pipes of said set have a length of 0.5 to 50 m.

11. A construction according to claim 7, claim 8 or claim 9 wherein the respective ferromagnetic pipes are of mild steel.

12. A construction according to claim 10 wherein the respective ferromagnetic pipes are of mild steel.

* * * * *